United States Patent
Yu

(10) Patent No.: US 9,369,264 B2
(45) Date of Patent: Jun. 14, 2016

(54) METHOD AND APPARATUS OF ALGORITHM FOR COHERENT RECEIVERS WITH M-QAM MODULATION FORMAT

(71) Applicant: ZTE (USA) Inc., Austin, TX (US)

(72) Inventor: Jianjun Yu, Basking Ridge, NJ (US)

(73) Assignee: ZTE (USA) Inc., Austin, TX (US)

(*) Notice: Subject to any disclaimer, the term of this patent is extended or adjusted under 35 U.S.C. 154(b) by 0 days.

(21) Appl. No.: 13/871,416

(22) Filed: Apr. 26, 2013

(65) Prior Publication Data

US 2013/0294783 A1 Nov. 7, 2013

Related U.S. Application Data

(60) Provisional application No. 61/642,676, filed on May 4, 2012.

(51) Int. Cl.
| | |
|---|---|
| *H04B 10/06* | (2006.01) |
| *H04L 7/00* | (2006.01) |
| *H04B 10/61* | (2013.01) |
| *H04L 27/38* | (2006.01) |
| *H04L 27/00* | (2006.01) |

(52) U.S. Cl.
CPC .......... *H04L 7/0075* (2013.01); *H04B 10/6165* (2013.01); *H04L 27/3818* (2013.01); *H04L 2027/0046* (2013.01); *H04L 2027/0067* (2013.01); *H04L 2027/0085* (2013.01)

(58) Field of Classification Search
USPC ................................................. 398/202–213
See application file for complete search history.

(56) References Cited

U.S. PATENT DOCUMENTS

| | | | | |
|---|---|---|---|---|
| 5,124,656 | A * | 6/1992 | Yassa .................... G01R 25/00 327/155 |
| 8,463,121 | B2 * | 6/2013 | Xu et al. ........................ 398/27 |
| 8,477,877 | B2 * | 7/2013 | Zhou ............................. 375/327 |
| 8,654,826 | B2 * | 2/2014 | Li et al. ........................ 375/224 |
| 2011/0085797 | A1 * | 4/2011 | Xu et al. ........................ 398/27 |
| 2011/0318021 | A1 * | 12/2011 | Zhou ............................. 398/202 |
| 2012/0026860 | A1 * | 2/2012 | Yan et al. ...................... 370/201 |
| 2012/0155890 | A1 * | 6/2012 | Zhou et al. .................... 398/208 |
| 2012/0237204 | A1 * | 9/2012 | Zhou ............................. 398/25 |
| 2012/0269247 | A1 * | 10/2012 | Li et al. ........................ 375/224 |
| 2013/0287410 | A1 * | 10/2013 | Leven .................... H04B 10/61 398/208 |

OTHER PUBLICATIONS

Cartwright: "Blind Phase Recovery in Cross QAM Communication Systems With Eighth-Order Statistics", IEEE Signal Processing Letters, vol. 8, No. 12, Dec. 2001, pp. 304-306.*
Yu, J. et al., "17 Tb/s (161×114 Gb/s) PolMux-RZ-8PSK transmission over 662 km of ultra-low loss fiber using C-band EDFA amplification and digital coherent detection." Proc. ECOC '08, Brussels, Belgium, Sep. 2008, Paper Th.3.E.2.

(Continued)

*Primary Examiner* — Li Liu
(74) *Attorney, Agent, or Firm* — Drinker Biddle & Reath LLP

(57) ABSTRACT

An improved Eighth-Order Statistics (EOS) blind phase recovery method is proposed for high-order coherent modulation formats. The method combining EOS blind phase estimate with maximum-likelihood (ML) carrier phase estimate uses multi-stage feed-forward carrier phase recovery algorithm. Experimental results show that the proposed new algorithm can reduce the required computational effort by more than a factor of 3 for 16-QAM system.

12 Claims, 6 Drawing Sheets

(56) References Cited

OTHER PUBLICATIONS

Zhou, X. et al., "Multi-level, multi-dimensional coding for high-speed and high spectral-efficiency optical transmission." *J. Lightw. Technol.* 27(16), pp. 3641-3653, Aug. 2009.

Zhou, X. et al., "Transmission of 32-Tb/s capacity over 580 km using RZ-shaped PDM-8QAM modulation format and cascaded multimodulus blind equalization algorithm." *J. Lightw. Technol.* 28(4), pp. 456-464, Feb. 2010.

Yu, J. et al., "16×107-Gb/s 12.5-GHz-Spaced PDM-36QAM Transmission Over 400 km of Standard Single-Mode Fiber." *IEEE Photon. Technol.* 22(17), pp. 1312-1314, Sep. 1, 2010.

Mori, Y. et al., "Unrepeated 200-km transmission of 40-Gbit/s 16-QAM signals using digital coherent optical receiver." Presented at the Proc. OECC 2008, 2008, PDP4.

Winzer, P.J. et al., "112-Gb/s polarization-multiplexed 16-QAM on a 25-GHz WDM grid." Proc. ECOC'08, Sep. 2008, Paper Th.3.E.5.

Zhou, X. et al., "200-Gb/s PDM-16QAM generation using a new synthesizing method." Presented at the ECOC2009, Vienna, Austria, 2009, Paper 10.3.5.

Cartwright, K.V., "Blind Phase Recovery in Cross QAM Communication Systems with Eighth-Order Statistics." *IEEE Signal Processing Letters* 8(12), pp. 304-306, Dec. 2001.

Chen, L. et al., "Blind Phase Recovery in QAM Communication Systems using Higher Order Statistics." *IEEE Signal Processing Letters* 3(5), pp. 147-149, May 1996.

Cao, Z. et al., "Reduction of Intersubcarrier Interference and Frequency-Selective Fading in OFDM-ROF Systems." *Journal of Lightwave Technology* 28(16), pp. 2423-2429, 2010.

Zhou, X. et al., "Two-stage feed-forward carrier phase recovery algorithm for high-order coherent modulation formats." In Proc. ECOC 2010, Torino, Italy, Sep. 2008, paper We.7.A.6.

Zhou, X., "An Improved Feed-Forward Carrier Recovery Algorithm for Coherent Receivers with M-QAM Modulation Format." *IEEE Photon. Technol.* 22(14), pp. 1051-1053, Jul. 15, 2010.

Zhou, X. et al., "64-Tb/s, 8 b/s/Hz, PDM-36QAM Transmission over 320 km Using Both Pre-and Post-Transmission Digital Signal Processing." *J. Lightw. Technol.* 29(4), pp. 571-577, Feb. 2011.

Pfau, T. et al., "Hardware-Efficient Coherent Digital Receiver Concept with Feedforward Carrier Recovery for M-QAM Constellations." *J. Lightw. Technol.* 27(8), pp. 989-999, Apr. 2011.

Ip, E. et al., "Feedforward carrier recovery for optical communication." *J. Lightw. Technol.* 25(16), pp. 2675-2692, Sep. 2007.

\* cited by examiner

US 9,369,264 B2

METHOD AND APPARATUS OF ALGORITHM FOR COHERENT RECEIVERS WITH M-QAM MODULATION FORMAT

CROSS-REFERENCE TO RELATED APPLICATIONS

This application claims priority to U.S. provisional application No. 61/642,676 which was filed on May 4, 2012.

FIELD OF THE INVENTION

The field of the present invention relates to a method and apparatus of employing a new algorithm for coherent receivers with M-QAM modulation format, and in particular, the method and apparatus employing a novel phase estimate scheme using multiple cascaded phase recovery stages to reduce the number of samples and the required computational effort.

BACKGROUND

Introduction

In recent years spectrally efficient modulation and detection technologies have been extensively explored in the research community with the goal of further increasing the spectral efficiency and therefore the overall fiber capacity [1-8]. While fast acquisition of the carrier phase is a crucial issue in high-speed communication systems that employ large quadrature amplitude modulation (QAM) modulation schemes, the high-order M-ary quadrature amplitude modulation (QAM) such as square 16-QAM and 64-QAM have attracted great attention due to their potential to realize high speed optical transmission at high spectral efficiencies [1]-[7].

For these high-order modulation formats, however, their tolerance to the laser phase noise decreases because the Euclidean distance is decreased [8]. Carrier phase recovery algorithm with better tolerance to laser phase noise is therefore very important for successful implementation of these high-order modulation formats. Phase recovery is a crucial problem in synchronous digital communication systems, especially for high bit rate signaling such as QAM modulation. There have been many techniques to retrieve phase information in coherent receivers [4]-[16].

The phase error can be corrected applying adaptive equalization with training sequences in baseband. Recently blind equalization based on higher order statistics has attracted extensive attention. The method based on blind phase search algorithm not only employs a feed-forward configuration but also involves all the current symbols for the phase estimation, and therefore can achieve a better tolerance to phase noise [12 and 13].

In this disclosure, we proposed a novel phase estimation scheme using multiple cascaded phase recovery stages. In the first stage, eighth-order statistics (EOS) based on the signal decimation is used to improve the performance for square and cross QAM systems in the fourth-power phase estimator, at the expense of increased complexity. This means that the number of samples can be reduced by a factor of at least four [9]. The EOS based on the signal decimation blind phase recovery method employs an approximate blind phase search. In the following stages, a constellation-assisted maximum-likelihood (ML) carrier phase estimate is used to find out a more accurate phase estimate by [12 and 13].

We experimentally demonstrate that the proposed new algorithm can reduce the required computational effort by more than a factor of 3 for 16-QAM system compared to that based on the single-stage EOS method.

SUMMARY OF THE INVENTION

Aspects of the present invention are directed to a method of employing algorithm for coherent receivers with M-QAM modulation format where the method is for carrier phase acquisition.

In one aspect, the present invention is directed to a method of employing a phase estimation scheme using multiple cascaded phase recovery stages. In another aspect, the present invention is directed to a method of multi-stage feed-forward carrier recovery. In still another aspect, the method of multi-stage feed-forward carrier recovery include a first stage where eighth-order statistics (EOS) based on the signal decimation is used; and at least a subsequence stage where a constellation-assisted maximum-likelihood (ML) carrier phase estimate is used.

DETAILED DESCRIPTION OF EMBODIMENTS

Principle of Algorithm

In the following, we assume that the system is already timing recovery and frequency-synchronized before phase estimation is attempted. Our focus in this disclosure is on carrier phase acquisition.

Figure 1:
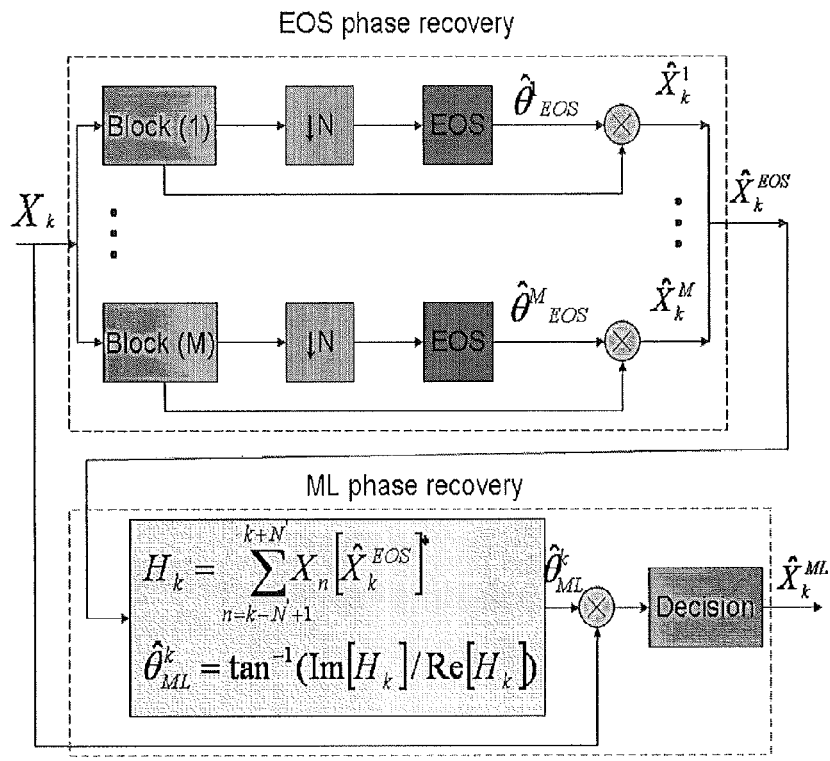
FIG. 1 is an illustration of the proposed algorithm.

Under the above assumptions, FIG. 1 shows the block diagram of the proposed multi-stage feed-forward carrier recovery method. In the first stage of this algorithm, the EOS based on the signal decimation blind phase recovery method is used to find out an approximate location of the optimal phase angle. The ML phase estimation in the second stage is used for implementing more accurate phase estimation. In order to further improve the accuracy of phase estimation, we can use more than one ML phase estimation to approach the optimal phase angle iteratively.

In the EOS method, the digital signal entering into the module of carrier phase recovery as $Y(k)=Y_q(k)+jY_i(k)$ is given by [9]

$$Y(k)=e^{j\theta}X(k)+N(k)$$

Where complex number X(k) is the QAM symbol transmitted at time kT, 1/T is the signaling rate, N is the noise, and θ is an unknown phase shift to be estimated. The received signal can be rewritten in terms of the received in-phase component $Y_q(k)$ and quadrature-phase component $Y_i(k)$ as follows $$Y_q(k) = A \cos \theta - B \sin \theta + N_q(k)$$

$$Y_i(k) = A \sin \theta + B \cos \theta + N_i(k)$$

The problem of the blind detection is to find out the estimation for θ without actually detecting the data X(k). Because X(k) is quadrant symmetrical, it is only possible to recover it within 90°.

Suppose the θ receiver parameters are known. Then an estimate of the original signal $X(k) \approx \hat{X}_q(k) + j\hat{X}_i(k)$ can be given as follows $$\hat{X}_q(k) = Y_q(k)\cos\theta + Y_i(k)\sin(\theta)$$

$$\hat{X}_i(k) = -Y_q(k)\sin\theta + Y_i(k)\cos(\theta) \quad (1)$$

Using Eq. 1, it can be shown that $$((\hat{X}_q(k))^2 - (\hat{X}_i(k))^2)^4 = (A\cos 4\theta + B \sin 4\theta + C)^2$$

Where $$A = \frac{Y_r^4 + Y_i^4 - 6Y_r^2 Y_i^2}{2}$$

$$B = 2(Y_r^3 Y_i - Y_r Y_i^3)$$

$$C = \frac{(Y_r^2 + Y_i^2)^2}{2}$$

The following cost function can be formed $$J = E\lfloor (A\alpha + B\beta + C)^2 \rfloor$$

Where α and β are parameters that can be used to minimize J to arrive at $$\alpha = \frac{E(AB)E(BC) - E(B^2)E(AC)}{E(A^2)E(B^2) - E^2(AB)} \quad (2)$$

$$\beta = \frac{E(AB)E(AC) - E(A^2)E(BC)}{E(A^2)E(B^2) - E^2(AB)} \quad (3)$$

By inspecting (2) and (3) we suggest that this minimization might produce α=K cos(4θ) and β=K sin(4θ), where K is a certain constant.

The corresponding θ estimate is given by $$\hat{\theta} = \frac{1}{4}\arctan\left(\frac{\beta}{\alpha}\right) \quad (4)$$

Since QAM constellations are rotationally invariant to rotations by multiples of 90, it is to use the four-quadrant inverse tangent function in Eq. 4, and the phase estimate appears to be unbiased when noise is present [9].

As it is desired to know within the four quadrant inverse tangent has to be used to calculate θ from Eq. 4. Note that it is not necessary to know β and α to determine θ, therefore, it is not necessary to know what constellation is transmitted. This is an advantage for multi-constellation systems.

Because the laser phase noise changes more slowly than other received noise contributions such as amplified spontaneous emission (ASE) noise, the phase noise can be estimated by averaging over multiple adjacent symbols. The EOS estimation is based on the assumption that the laser phase does not change over multiple symbol periods. During this period of time, the EOS estimate of ω is the value $\hat{\theta}$ $$\hat{\omega}_{(M,K)} = \hat{\theta}_{(M,K)}$$

Where K denotes the number of symbols over which ω is not changed. M parallel blocks are required to test the different phase values.

The benefit to EOS estimate is that it can estimate the phase shift $\hat{\theta}$ without the received signals of the modulation type. The EOS estimate method does not use rotation decision, square, comparison, and so forth compared with the blind phase search (BPS) algorithm for each symbol [15]. The proposed method requires all symbols in a block to process as a whole. The EOS method requires all the current symbols in a block to process as a whole. While the EOS method involves all the current symbols in a block for the phase estimation, and the required computational effort for the proposed is not trivial. To reduce the computational effort, we propose a new EOS estimation structure based on the signal decimation. The new method doesn't require all symbols in a block to be tested. First the symbol sequences are lowered by an integer factor N such that the amount of the new symbol sequence is 1/N of that of the original symbol sequence. Then EOS blind phase recovery estimation is used in the new symbol sequence.

The decoded/decided signals $\hat{X}_k^{EOS}$ based on the improved EOS phase estimation are then fed into the second stage where an ML phase estimate is employed to find a more accurate phase estimate by [15]

$$H_k = \sum_{n=k-N+1}^{k+N} X_n [\hat{X}_k^{EOS}]^*$$

$$\phi_k^{ML} = \tan^{-1}(\text{Im}[H_k]/\text{Re}[H_k])$$

The decoded signal $\hat{X}_k^{ML}$ based on this ML phase estimate along with the original signal may be passed into another ML phase estimation stage to further refine the phase estimation. This technique is referred as constellation-assisted ML phase estimate [15].

Experimental Setup

Figure 2:
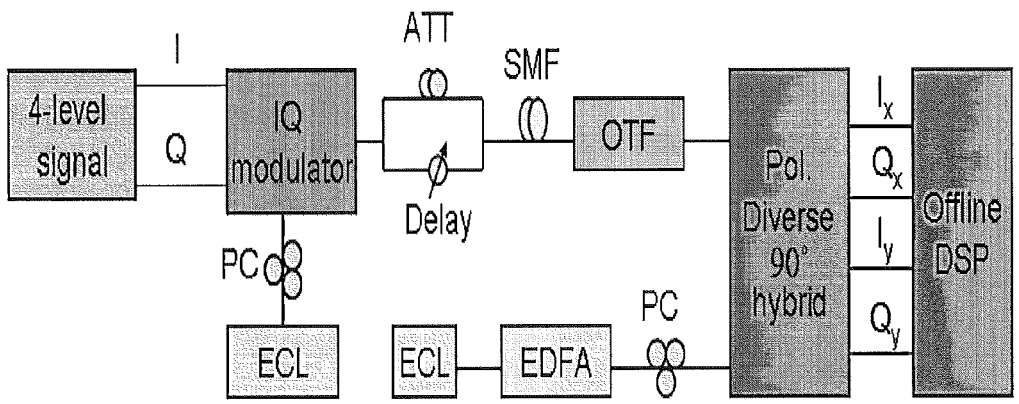
FIG. 2 is the experimental setup for PDM 16-QAM transmission.

The effectiveness of the proposed multi-stage algorithm has been tested in a PDM 16-QAM experiment. The experimental setup for PDM 16-QAM transmission is shown in FIG. 2.

The 16-QAM optical signal is generated by an IQ modulator driven with the 16-QAM baseband signal from a commercial arbitrary waveform generator (AWG) at 4-Gsample/s. The AWG in the interleaving mode is used to achieve such a high sampling rate that the analog output (four-level signals with the pseudorandom pattern length of 212) and its delayed inverse copy are used as the in-phase and quadrature components, respectively. Raised-cosine pulse shaping with a roll-off factor β=0.9 is used to restrict the signal spectrum. At the receiver, an optical tunable filter (OTF) with 3 dB bandwidth of 1 nm is used to select the desired channel. A polarization-diversity 90-degree hybrid, a tunable ECL local oscillator (with a line-width of about 100-kHz) and four single-ended photo-detectors are used for implementing polarization and phase-diverse coherent detection. The distortion due to the square-law detection of the photodiodes is mitigated using a relatively high local-oscillator-to-signal power ratio, which was set to be 20-dBm in this experiment. The analog-to-digital conversion is achieved using a 4-channel digital storage scope with the sampling rate of 20-Gs/s and the electrical bandwidth of 8-GHz. The captured data is then post-processed offline using a desktop computer.

Figure 3:
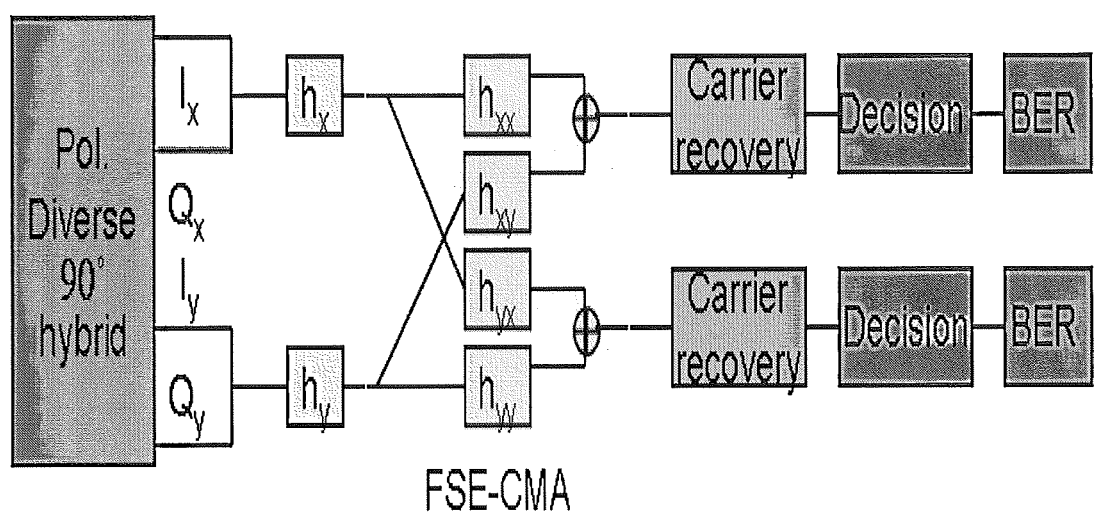
FIG. 3 is the illustration of a typical digital coherent receiver using balanced photo-detection.

FIG. 3 gives an illustration of a digital coherent receiver which adopts balanced photo-detection and includes the typical DSP functional blocks.

In the DSP part, four adaptive finite impulse response (FIR) filters (each with 11 taps), optimized by the fractionally spaced constant modulus algorithm (FSE-CMA), are used to implement the polarization recovery and de-multiplexing for the PDM 16-QAM signal as well as the compensation of polarization mode dispersion (PMD). The carrier recovery is implemented using an improved EOS blind phase recovery method.

The differential decoding is applied to solve the problem of phase ambiguity. Finally, we carry out Gray-code mapping and bit-error-rate (BER) counting. We analyze the performance of carrier recovery algorithm by using different factor N value.

Experimental Results

The effectiveness of the above described algorithm was tested in a back-to-back PDM 16-QAM experiment.

Figure 4A:
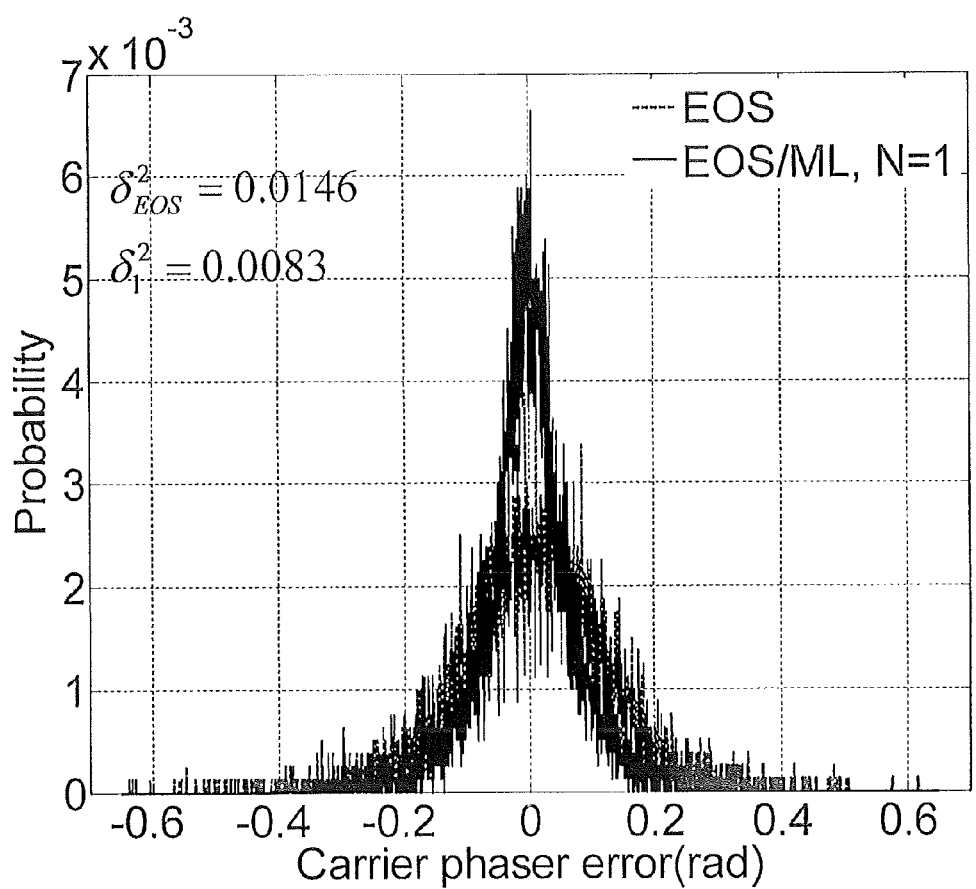
FIG. 4A shows the probability density distribution of the carrier phase error with EOS method and the proposed algorithm with N=1 for 16-QAM with OSNR=25 dB.
Figure 4B:
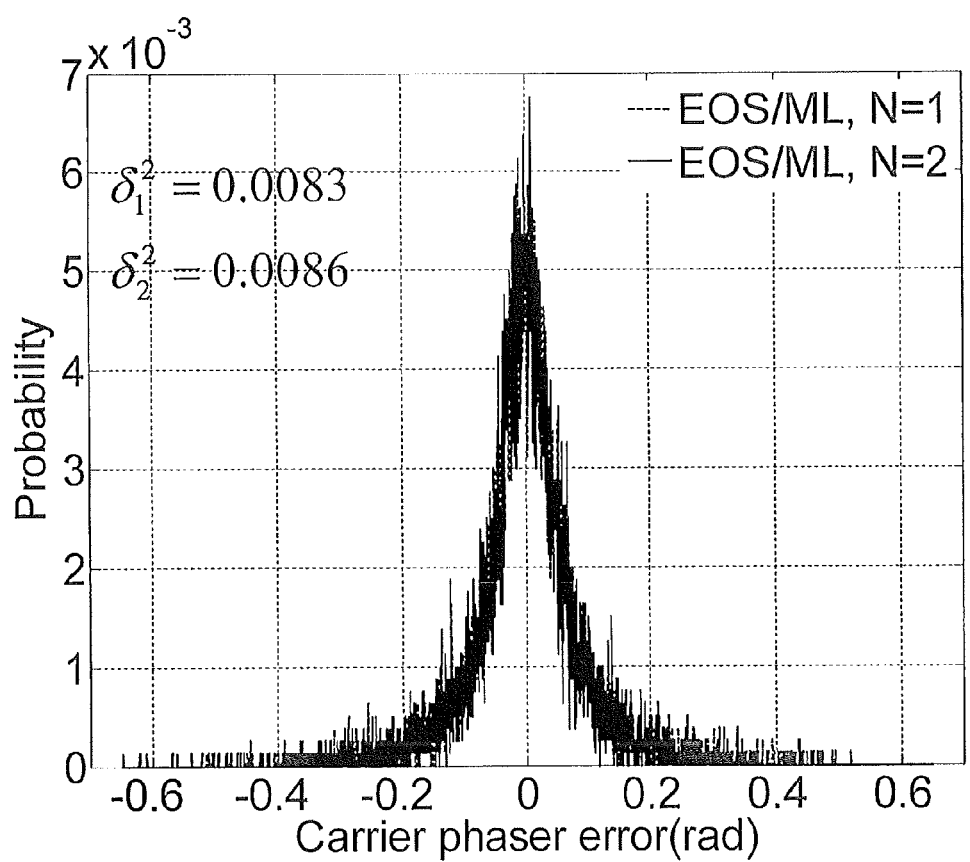
FIG. 4B shows the probability density distribution of the carrier phase error with the proposed algorithm with N=1 and 2 for 16-QAM with OSNR=25 dB.
Figure 4C:
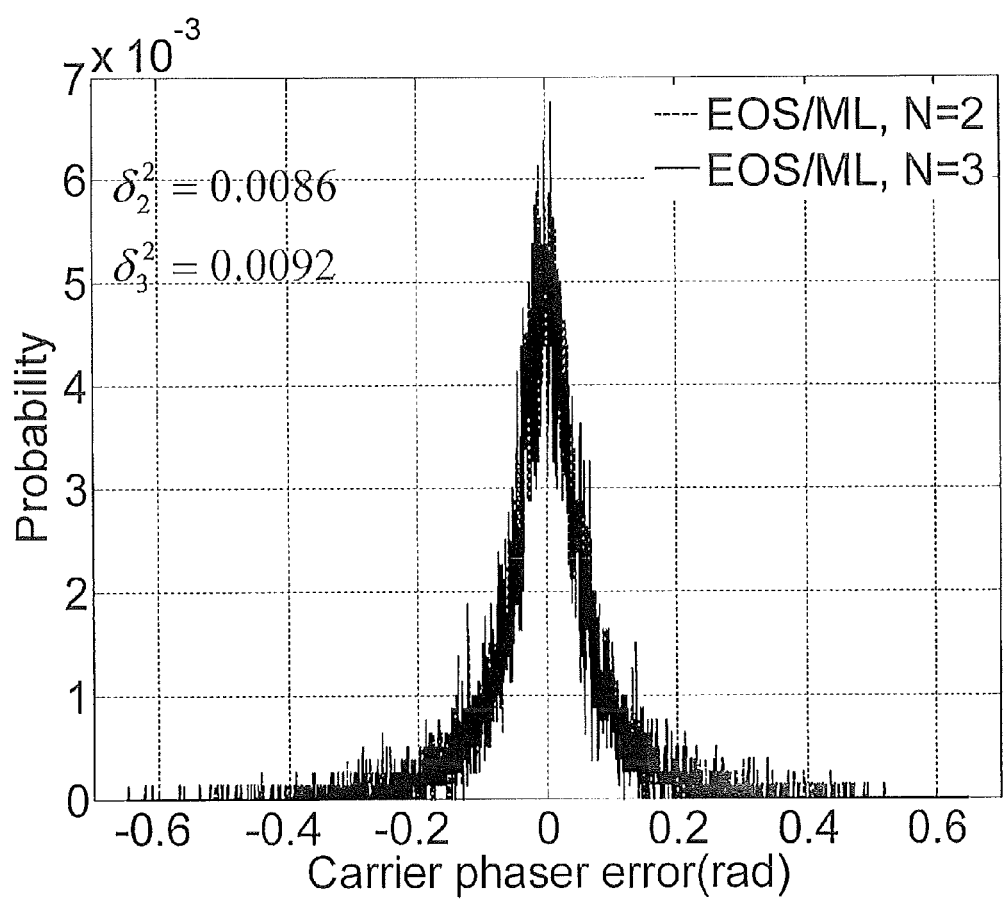
FIG. 4C shows the probability density distribution of the carrier phase error with N=2 and 3 for 16-QAM with OSNR=25 dB.

FIG. 4 shows the carrier-phase error distribution for 16-QAM after applying the proposed algorithm by using different factor N value (N=1, 2, 3 and 4, respectively) and without this two-stage carrier phase estimation (the EOS method). The variance of carrier phase error with EOS method is $\delta_{EOS}^2$. The variance of carrier phase error with EOS method is $\delta_{EOS/ML,N=1}^2$, $\delta_{EOS/ML,N=2}^2$ and $\delta_{EOS/ML,N=3}^2$ with the proposed algorithm using the factor N=1, 2 and 3, respectively. We can see that the $\delta_N^2$ increases when N is increased. It illustrates that phase estimation performance decreases when N is increased. Because the new sequence supports a part of the original sequence information, the symbol decimation affects the quality of the symbol which is decreased when N is increased.

Figure 5:
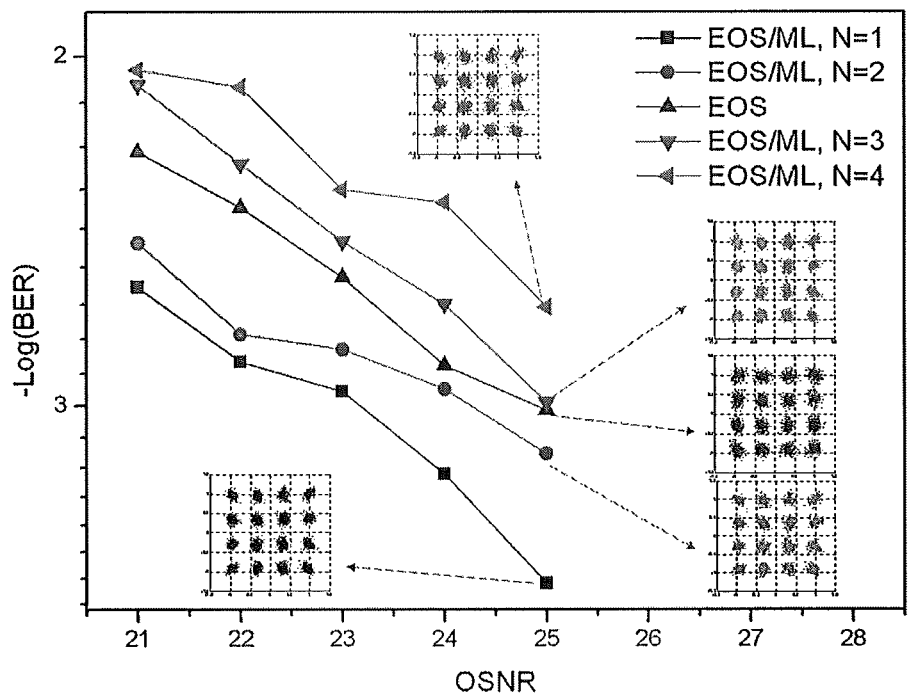
FIG. 5 shows that BER cures for signal with different phase recovery methods and the corresponding constellation diagrams for back-to-back performance with M=50.

FIG. 5 shows the measured BER performance versus the received OSNR with M=50. We compared the BER performance of the signal using EOS method and the signal using the proposed algorithm with different N. The BER performance becomes worse when N is large, such as N=4, by using this new method. The BER performance of the signal using EOS method is worse than that of the improved EOS method with N=2, but better than that of the improved EOS method with N=3. It is clearly shown that the received sensitivity has been improved about 2 dB and 1 dB with N=1 and 3, respectively, by EOS method at a BER of 1×10−3.

Figure 6:
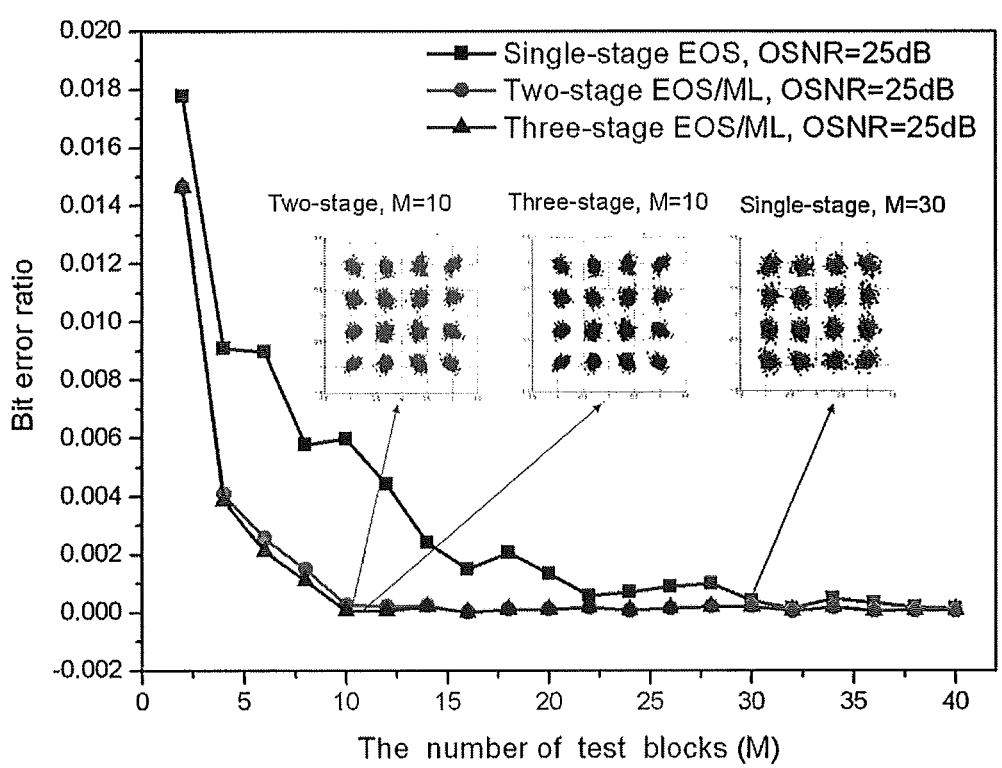
FIG. 6 shows the experimental results of the required number of test blocks using three different phase estimate algorithms with the OSNR of 25 dB, wherein the measured BER versus the equivalent number of the required number of test blocks using the three different carrier phase recovery algorithms including the single-stage EOS method, two-stage BPS/ML method and three-stage hybrid BPS/ML method.

FIG. 6 gives the measured BER versus the equivalent number of the required number of test blocks using three different carrier phase recovery algorithms including the single-stage EOS method, two-stage BPS/ML method and three-stage hybrid BPS/ML method. We can find from FIG. 6 that, in order to achieve a performance close to the optimum, the single-stage EOS method needs to test about 30 test blocks while the proposed three-stage hybrid EOS/ML method about 10 test blocks, resulting in a reduction of computational effort by more than a factor of 3.

CONCLUSION

In this disclosure, a novel laser-linewidth tolerant multi-stage feed-forward carrier recovery algorithm for the general M-QAM systems has been proposed and experimentally demonstrated. The method combines EOS based on the signal decimation blind phase estimate with ML carrier phase estimate. Compared to the previous technique based on the single-stage EOS method, the new hybrid algorithm can reduce the required computational effort by more than a factor of 3 for the 16-QAM systems.

It should be understood that the methods and devices of the present invention may be executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EEPROM's); and the like. Implementations of certain embodiments may further take the form of machine-implemented, including web-implemented, computer software.

While aspects of this invention have been shown and described, it will be apparent to those skilled in the art that many more modifications are possible without departing from the inventive concepts that are described herein. The invention, therefore, is not to be restricted except in the spirit of the following claims.

The references cited in this disclosure are hereby incorporated by reference.

REFERENCES

[1] J. Yu, X. Zhou, M. F. Huang, Y. Shao, D. Qian, T. Wang, M. Cvijetic, P. Magill, L. Nelson, M. Birk, S. Ten, H. B. Matthew, and S. K. Mishra, "17 Tb/s (161×114 Gb/s) Pol-Mux-RZ-8PSK transmission over 662 km of ultra-low loss fiber using C-band EDFA amplification and digital coherent detection," in Proc. ECOC'08, Brussel, Belgium, September 2008, Paper Th. 3. E. 2.

[2] X. Zhou and J. Yu, "Multi-level, multi-dimensional coding for high-speed and high spectral-efficiency optical transmission," J. Lightw. Technol., vol. 27, no. 16, pp. 3641-3653, August 2009.

[3] X. Zhou, J. Yu, M. Huang, Y. Shao, T. Wang, P. D. Magill, M. Cvijetic, Nelson, M. Birk, G. Zhang, S. Ten, H. B. Matthew, and S. K. Mishra, "Transmission of 32-Tb/s capacity over 580 km using RZ-shaped PDM-8QAM modulation format and cascaded multimodulus blind equalization algorithm," J. Lightw. Technol., vol. 28, no. 4, pp. 456-464, February 2010.

[4] J. Yu and X. Zhou, "16×107-Gb/s 12.5-GHz-Spaced PDM-36QAM Transmission Over 400 km of Standard Single-Mode Fiber," IEEE Photon. Technol., vol. 22, no. 17, pp. 1312-1314, Sep. 1, 2010.

[5] Y. Mori, C. Zhang, K. Igarashi, K. Katoh, and K. Kikuchi, "Unrepeated 200-km transmission of 40-Gbit/s 16-QAM signals using digital coherent optical receiver," presented at the Proc. OECC 2008, 2008, PDP4.

[6] P. J. Winzer and A. H. Gnauck, "112-Gb/s polarization-multiplexed 16-QAM on a 25-GHz WDM grid," in Proc. ECOC'08, September 2008, Paper Th. 3. E. 5.

[7] X. Zhou and J. Yu, "200-Gb/s PDM-16QAM generation using a new synthesizing method," presented at the ECOC2009, Vienna, Austria, 2009, Paper 10.3.5.

[8] X. Zhou and J. Yu, "Multi-level, multi-dimensional coding for high-speed and high spectral-efficiency optical transmission," J. Lightw. Technol., vol. 27, no. 16, pp. 3641-3653, Aug. 15, 2010.

[9] K. V. Cartwright, "Blind Phase Recovery in Cross QAM Communication Systems With Eighth-Order Statistics," IEEE Signal Processing Letters, vol. 8, no. 12, pp. 304-306, December 2001.

[10] L. Chen, H. Kusaka, and M. Kominami, "Blind Phase Recovery in QAM Communication Systems Using Higher Order Statistics," IEEE Signal Processing Letters, vol. 3, no. 5, pp. 147-149, May 1996.

[11] Z. Cao, J. Yu, M. Xia, Q. Tang, Y. Gao, W. Wang, and L. Chen, "Reduction of Intersubcarrier Interference and Frequency-Selective Fading in OFDM-ROF Systems," Lightwave Technology, Journal of, vol. 28, no. 16, p. 2423-2429, 2010.

[12] X. Zhou and J. Yu, "Two-stage feed-forward carrier phase recovery algorithm for high-order coherent modulation formats," in Proc. ECOC 2010, Torino, Italy, September 2008, Paper We. 7. A. 6.

[13] X. Zhou, "An Improved Feed-Forward Carrier Recovery Algorithm for Coherent Receivers With M-QAM Modulation Format," IEEE Photon, Technol., vol. 22, no. 14, pp. 1051-1053, Jul. 15, 2010.

[14] X. Zhou, J. Yu, M.-F. Huang, et al., "64-Tb/s, 8 b/s/Hz, PDM-36QAM Transmission Over 320 km Using Both Pre- and Post-Transmission Digital Signal Processing," J. Lightw. Technol., vol. 29, no. 4, pp. 571-577, February 2011.

[15] T. Pfau, S. Hoffmann, and R. Noé, "Hardware-Efficient Coherent Digital Receiver Concept With Feedforward Carrier Recovery for M-QAM Constellations," J. Lightw. Technol., vol. 27, no. 8, pp. 989-999, April 2011.

[16] E. IP and J. Kahn, "Feedforward carrier recovery for optical communication," J. Lightw. Technol., vol. 25, no. 16, pp. 2675-2692, September 2007.

What is claimed is:

1. A method for carrier phase recovery of a carrier wave, the method comprising:
   receiving a carrier wave that was modulated at a signaling rate with a plurality of digital signals;
   generating a first estimate of the carrier wave's phase angle using eighth-order statistics (EOS) comprising
      dividing the digital signal into M number of blocks, wherein M does not exceed 10,
      performing signal decimation on each of the M number of blocks by lowering the symbol sequences by an integer factor N to form a new signal sequence in each of the M number of blocks,
      performing EOS blind phase recovery estimation on each of the new signal sequences; and
   generating a second estimate of the carrier wave's phase angle comprising performing a maximum likelihood estimate based at least in part on the first estimate.

2. The method of claim 1, wherein the carrier wave is modulated with M-ary quadrature amplitude modulation.

3. The method of claim 1, wherein the computational effort of estimating the carrier wave's phase using the eighth order statistics estimate based on the group of selected samples, followed by generating at least one additional estimate of the carrier wave's phase angle including performing a maximum likelihood estimate based at least in part on the preceding estimate, is reduced by more than a factor of 3 for a 16-QAM system as compared to the computational effort of estimating the carrier wave's phase using a single stage eighth-order statistics method based on all of the contiguous samples from which the group of selected samples was selected, while maintaining at least the same bit error rate (BER) performance.

4. The method of claim 1, further comprising generating a third estimate of the carrier wave's phase angle based at least in part on the second estimate.

5. An article of manufacture including a non-transitory computer-readable medium having instructions stored thereon, the instructions comprising:
   instructions for sampling a received carrier wave modulated at a signaling rate with a plurality of digital signals;
   instructions for generating a first estimate of the carrier wave's phase angle comprising
      dividing the digital signal into M number of blocks, wherein M does not exceed 10,
      performing signal decimation on each of the M number of blocks by lowering the symbol sequences by an integer factor N to form a new signal sequence in each of the M number of blocks,
      performing EOS blind phase recovery estimation on each of the new signal sequences; and
   instructions for generating a second estimate of the carrier wave's phase angle based at least in part on the first estimate.

6. The article of manufacture of claim 5, wherein the carrier wave is modulated with M-ary quadrature amplitude modulation.

7. The article of manufacture of claim 5, wherein the generating a second phase angle estimate comprises performing a maximum likelihood estimate based at least in part on the first phase angle estimate.

8. The article of manufacture of claim 7, wherein the instructions stored thereon further comprise generating a third phase angle estimate based at least in part on the second estimate.

9. An apparatus for carrier phase recovery of a carrier wave, the apparatus comprising:
   a receiver for receiving a carrier wave modulated at a signaling rate with a plurality of digital signals;
   a first phase angle estimator for generating a first estimate of the carrier wave's phase angle using eighth-order statistics comprising
      dividing the digital signal into M number of blocks, wherein M does not exceed 10,
      performing signal decimation on each of the M number of blocks by lowering the symbol sequences by an integer factor N to form a new signal sequence in each of the M number of blocks,
      performing EOS blind phase recovery estimation on each of the new signal sequences; and
   a second phase angle estimator for generating a second estimate of the carrier wave's phase angle based at least in part on the first estimate.

10. The apparatus of claim 9, wherein the carrier wave is modulated with M-ary quadrature amplitude modulation.

11. The apparatus of claim 10, wherein the second phase angle estimator generates a second phase angle estimate, including performing a maximum likelihood estimate based at least in part on the first phase angle estimate.

12. The apparatus of claim 11, further comprising a third phase angle estimator for generating a third estimate of the carrier wave's phase angle based at least in part on the second phase angle estimate.

* * * * *